…

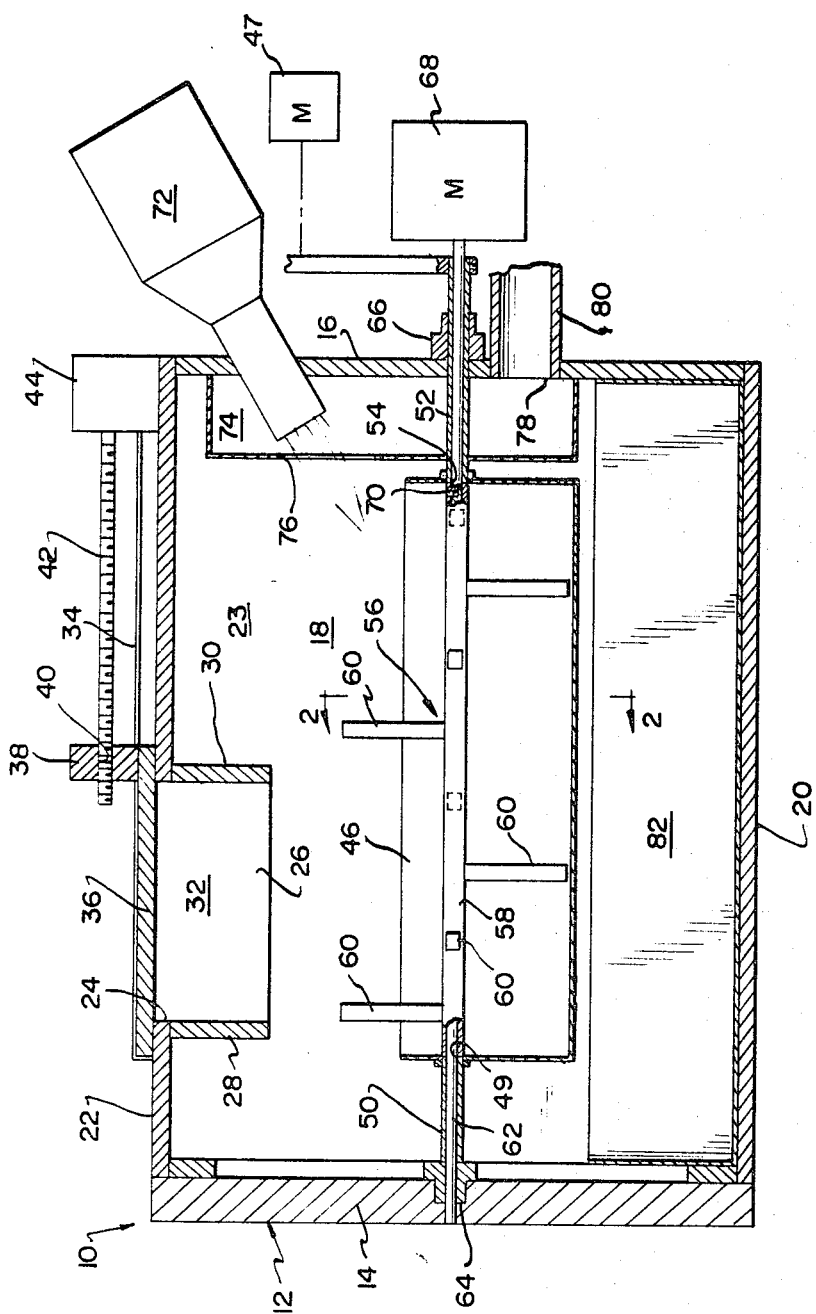

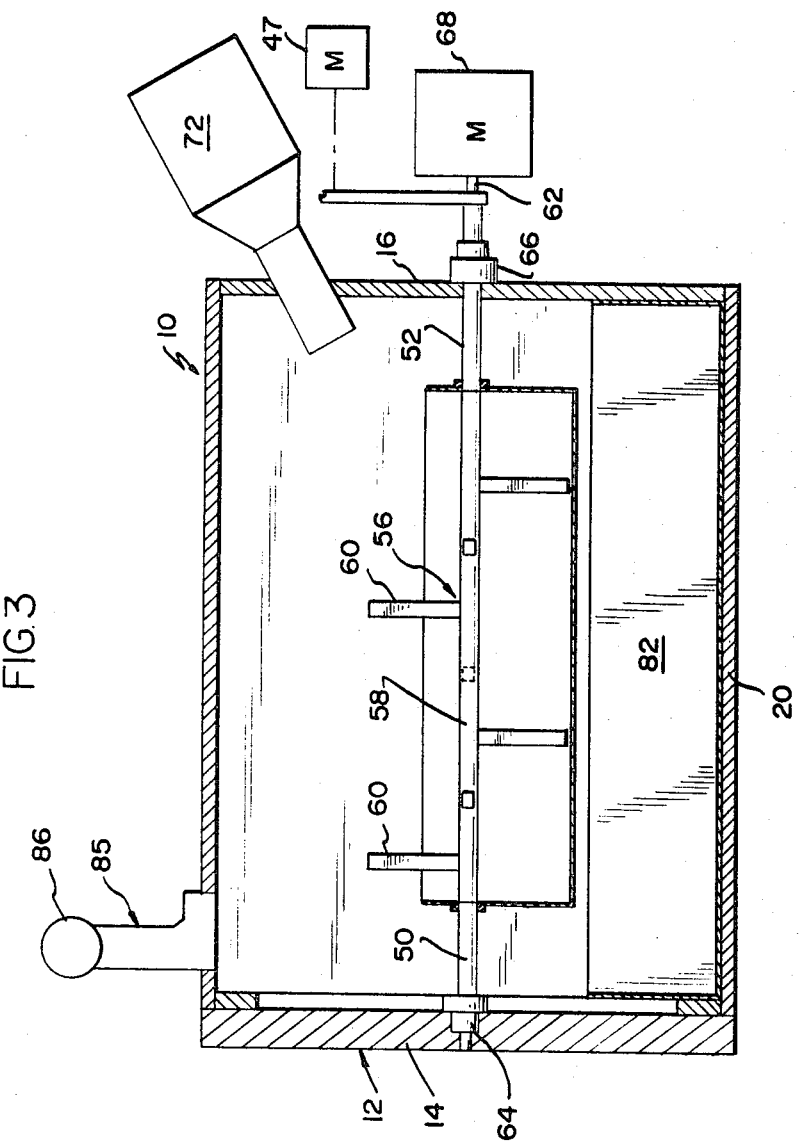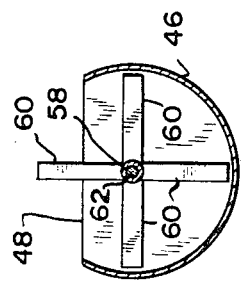

United States Patent Office 3,418,952
Patented Dec. 31, 1968

3,418,952
INCINERATOR
Floyd H. Meller, Lexington, Mass., and Charles L. Swanson, Cincinnati, Ohio, assignors to Fairbanks Morse Inc., New York, N.Y., a corporation of Delaware
Filed Apr. 10, 1967, Ser. No. 629,742
13 Claims. (Cl. 110—8)

ABSTRACT OF THE DISCLOSURE

An incinerator for burning combustible sewage, garbage and industrial wastes. The incinerator construction is such that combustible wastes, which are preferably pretreated to reduce their moisture contents, are fed into a combustion chamber. This chamber includes a rotatable firebox in which the waste materials are deposited. A burner unit communicates with the combustion chamber and is arranged to direct a flame at the fire box and at a predetermined angle with respect to the box. During the combustion process, an agitator in the fire box is rotated to churn the waste material therein to promote complete combustion of the material. Gases evolved by the burning waste material are also subjected to the intense heat of the burner flame to produce their substantially complete combustion. Upon completion of a combustion cycle, the fire box is rotated and the ash residue is discharged into a disposal chamber. Another charge of waste material, which may be retained above the combustion chamber during a combustion cycle to utilize the heat generated thereby for drying purposes, is deposited into the combustion chamber and the cycle is repeated.

---

The invention relates to an incinerator for destruction of sewage solids, garbage and/or industrial wastes for limited waste treatment applications, such as individual homes, office and industrial buildings, military installations and ships. The incinerator of the invention produces destruction of wastes that may be flushed into a drainage system and contemplates the destruction of the waste solids after the separation from the waste liquids by a system such as is disclosed in our copending application Ser. No. 535,474, filed Mar. 18, 1966, for a "Solids Interception System."

Heretofore, apparatus has been devised for incinerating human wastes in a self-contained incinerating toilet in which the wastes are deposited directly in the unit. A disadvantage of apparatus of this type is excessive heating resulting from continued use. Another disadvantage of incinerator toilets is the incomplete combustion of fumes. Prior art household incinerators are characterized by open grates and relatively large combustion chambers and are wholly unsuited to the incineration of wet sludges.

The primary object of the invention, therefore, is to provide a compact incinerator unit for destruction of wet sludges remotely from toilet fixtures.

Another object of the invention is to provide a relatively small volume compact incinerator in accordance with the preceding object wherein means are provided for effecting complete combustion of waste gases.

A further object of the invention is to provide an incinerator in accordance with the preceding objects wherein means are provided for containing a wet charge while combustion is effected and wherein means are provided for dumping said last-named means upon completion of the combustion cycle.

Another object of the invention is to provide an incinerator in accordance with the preceding objects wherein efficient and effective means are provided for effecting agitation of the charge during the combustion process. These and other objects will be apparent as the description proceeds with reference to the accompanying drawing.

FIGURE 1 is a vertical sectional view of an incinerator unit made in accordance with the present invention;
FIGURE 2 is an elevational sectional view taken substantially on line 2—2 of FIGURE 1; and
FIGURE 3 is a partial vertical sectional view of a modification of the incinerator unit of FIGURE 1.

Referring now to the drawings, the incinerator unit of the present invention is indicated by reference numeral 10 and includes a housing 12 having insulated end walls 14 and 16, insulated side walls 18 (only one of which is shown), an insulated bottom wall 20 and an insulated top wall 22.

The top wall 22 is formed with an opening 24. The housing 12 defines a chamber generally designated 23. Mounted on the top wall 22 are a pair of parallel tracks 34 within which is slidably disposed a closure member 36 having an upstanding standard 38 formed with a tapped opening 40 for reception of a screw 42 which may be rotated by a motor 44 for movement of the closure member 36 from the fully closed operative position shown in FIGURE 1 to an inoperative open position in which a sludge charge may be received through opening 24.

A fire box, generally designated 46, is mounted for tipping rotation within chamber 23. The fire box is of substantially hollow cylindrical configuration having a top opening 48, as shown in FIG. 2, conforming in general to a chord of the cylindrical fire box 46. Extending outwordly from the left end of the fire box 46 shown in FIGURE 1 and through an opening 49 therein is a shaft or tube 50. In like manner, a shaft or tube 52 is passing through an opening 54 and secured to the right end wall of the fire box 46. Shafts 50 and 52 thereby serve to support fire box 46 and can be actuated to rotate fire box 46 through the operation of motor 47 and belt 48. Mounted for independent rotation within the fire box 46 is an agitator, generally designated 56, having a central shaft or tube 58 which abuts shafts 50 and 52 at its opposite ends, and a plurality of longitudinally and circumferentially spaced radially outwardly extending paddles 60 extending into close proximity to the cylindrical wall of the fire box 46, as best seen in FIGURE 2. The agitator 56 is rotated during a combustion cycle by means of an elongated driving shaft 62 which is journalled in bearings 64 and 66, extends through shaft portions 50, 52 and 58, and is rotated by a motor 68. A driving relation between the shaft 62 and the tube 58 is effected by means of a set screw 70 threaded through tube 58 and into shaft 62.

After a sludge charge is received in the fire box 46 through the opening 24, the agitator 56 is continuously rotated as the sludge is incinerated by means of a burner 72 which is angularly disposed with respect to the end wall 16 and produces a sheet of flame covering the interior of the fire box 46. An exhaust chamber 74 is provided at the right side of the chamber 23 shown in FIGURE 1. The exhaust chamber 74 has an inlet 76 and an outlet 78 to which is conected a flue pipe 80. The opening 76 is positioned with respect to the left end of the burner 72 so that combustion gases passing into the chamber 74 are burned with a flame scouring action before passing into the chamber 74. It will be noted that the exit 78 may be positioned in any of several convenient places in the end wall 16.

The incinerator of the present invention exhibits important advantages over compact household type incinerators heretofore known. For instance, the agitator of the present invention effects a continuous stirring action in the fire box during incineration to assure complete combustion of the contents. This is true because the solids are broken into smaller particles and thus new surfaces are continuously exposed. Thus, combustion is effected at a lower fuel consumption. The use of the radial agitator paddles is more effective than shear type agitators and less power is required because of tumbling, rather than shearing. The agitator of the invention has proved effective, as compared to shear-type agitators, because of the changing nature of the material during the combustion cycle. It has been found that the power requirements for shear bar agitators varies from a low level when material is of tobacco-like texture to a very high level when dried lumps are broken. Similar results were obtained in testing rotary beater and rotary cylinder mixers.

Either gas or hydrocarbon fuels may be used for the burner 72. The air supply for combustion may be provided on a forced draft or induced draft basis. It is preferred that induced draft be utilized for the reason that stack temperatures may easily be controlled and thus conventional stack materials can be used. The use of induced draft provides controlled dilution and thus reduces residual odors. The arrangement of the burner produces a flame which effects a scrubbing effect on exhaust gases and enhances the combustion of these gases without the need for an additional or secondary burner in the stack. Also, the angular arrangement of the burner enhances combustion as fresh surfaces of the material are uncovered. It has been found that exhaust gas temperatures in the range of 1200° to 1400° F. provide efficient fume control.

The sliding cover plate or closure 36 is normally closed during an incineration cycle to prevent heat losses from the chamber 23.

Since the incineration cycle is of significant duration, it is contemplated that means be provided to contain and retain solid materials deposited during the burning cycle until they can be deposited in fire box 46 in chamber 23. This may take the form of a simple enclosure (not shown) positioned above top wall 22 and through which the closure plate 36 may project. An advantage of providing a collection chamber is that the moisture content of the solids is greatly reduced prior to deposit in chamber 23, and thus the fuel requirements are diminished.

In the modified embodiment of the incinerator of the invention illustrated in FIG. 3, the exhaust chamber 74, outlet 78 and lower flue pipe 80 have been omitted from the construction. An open construction is employed wherein the flame of the burner is directed into the rotatable fire box 46. The gaseous products of combustion are carried to an exhaust stack 85 which opens into top wall 22 of chamber 23 located above the flame nozzle of angularly directed burner 72. As is shown in FIG. 3, the exhaust stack extends generally vertically with respect to the wall 22 and terminates in a laterally extending generally cylindrical exhaust director member 86 which, in selected applications, can carry the hot exhaust to an aftercooler element (not shown). By positioning the exhaust stack outlet above the burner, gases passing from the chamber 23 are flame scrubbed in a manner similar to that produced by the exhaust chamber 74 of the embodiment of FIG. 1. Other than the above modifications, the embodiments of FIGS. 1 and 3 are substantially the same.

At the completion of a burning cycle, the ash residue is dumped from the fire box 46 and is received in a sliding drawer 82. The ash residue accumulation in the drawer is disposed of periodically, either by manual removal or by continuous flushing, such as by effluent waters from a waste water treatment apparatus. The ash is biologically inert and produces no health hazard.

The above description is illustrative only and is not intended to limit the scope of applicants' invention. Applicants intend to be limited only by the scope of the appended claims.

We claim:
1. An incinerator comprising an insulated housing defining a combustion chamber, an apertured fire box rotatably mounted to dump ashes in said housing, a rotary agitator disposed within said fire box, said housing having an opening for reception of a charge of sewage solids into said fire box, means for rotating said agitator, a burner mounted in said housing to direct a flame into said sewage charge as the charge is agitated, and an exhaust means having an inlet in communication with said combustion chamber and an exhaust outlet.

2. An incinerator in accordance with claim 1, wherein said burner is positioned with respect to the inlet of said exhaust means so as to effect substantially complete combustion of fumes passing into the exhaust means.

3. An incinerator in accordance with claim 1, wherein a pair of tracks are mounted in parallel relation surrounding the opening to said chamber and wherein a closure member is slidably disposed in said tracks.

4. An incinerator in accordance with claim 3, wherein means are provided for actuating said closure member.

5. An incinerator in accordance with claim 1, wherein said fire box is of hollow imperforate substantially cylindrical configuration having a chordal opening extending the length thereof.

6. An incinerator in accordance with claim 5, wherein said agitator comprises an elongate shaft having a plurality of longitudinally spaced radially extending circumferentially spaced paddles.

7. An incinerator in accordance with claim 6, wherein successive paddles are spaced approximately 90° from the preceding paddle.

8. An incinerator in accordance with claim 6, wherein means are provided for effecting rotation of said agitator to mix and break up solids during the combustion cycle.

9. An incinerator in accordance with claim 8, wherein said fire box is supported at each end with an elongated support tube; is provided with means for journalling said agitator shaft, and is provided with means for rotating said fire box at the completion of the combustion cycle to remove ashes therefrom.

10. An incinerator in accordance with claim 9, wherein a receptacle is positioned within said housing for reception and disposal of ash residue received from said fire box.

11. An incinerator in accordance with claim 1, wherein said exhaust means comprises means for providing a chamber, the chamber having an exhaust gas inlet aligned in the path of the flame discharged from the burner, and having an exhaust outlet spaced from the inlet for the discharge of gases substantially free of combustible products.

12. An incinerator in accordance with claim 1, wherein said exhaust means comprises an exhaust stack opening into said combustion chamber above the flame directing nozzle of the burner mounted in said housing and in a manner such that gases passing from the combustion chamber are subjected to the intense heat of the burner flame to burn substantially all of the combustible products carried by the gas being exhausted.

13. An incinerator in accordance with claim 1, wherein said agitator comprises an elongated tube journalled on and supported by an elongated shaft, means for driving the tube to rotate the agitator and means for driving the shaft to rotate the fire box, the tube and the shaft being independently operable.

References Cited
UNITED STATES PATENTS

| | | | |
|---|---|---|---|
| 911,375 | 2/1909 | Burwell | 110—8 C |
| 1,103,956 | 7/1914 | Goeden | 110—18 |
| 1,160,360 | 11/1915 | Atterbury et al. | 110—8 C |
| 1,476,490 | 12/1923 | Christensen et al. | 110—8 CX |
| 2,882,534 | 4/1959 | Jauch et al. | 110—9 EX |
| 3,306,237 | 2/1967 | Ransom | 110—14 |
| 3,323,473 | 6/1967 | Frankel | 110—9 |

JAMES W. WESTHAVER, *Primary Examiner.*

U.S. Cl. X.R.

110—14